(12) United States Patent
Kulkarni et al.

(10) Patent No.: US 11,037,549 B1
(45) Date of Patent: Jun. 15, 2021

(54) SYSTEM AND METHOD FOR AUTOMATING THE TRAINING OF ENTERPRISE CUSTOMER RESPONSE SYSTEMS USING A RANGE OF DYNAMIC OR GENERIC DATA SETS

(71) Applicant: Inference Communications Pty Ltd, Melbourne (AU)

(72) Inventors: Santosh Kulkarni, Glen Waverley (AU); Sachin Pathiyan Cherumanal, Glen Huntly (AU); Damiano Spina, Elsternwick (AU); Minyi Li, Burwood (AU); Lawrence Cavedon, Fitzroy (AU)

(73) Assignee: Inference Communications Pty Ltd, Melbourne (AU)

( * ) Notice: Subject to any disclaimer, the term of this patent is extended or adjusted under 35 U.S.C. 154(b) by 0 days.

(21) Appl. No.: 16/929,675

(22) Filed: Jul. 15, 2020

Related U.S. Application Data

(60) Provisional application No. 63/035,506, filed on Jun. 5, 2020.

(51) Int. Cl.
| | |
|---|---|
| *G10L 15/06* | (2013.01) |
| *G10L 15/18* | (2013.01) |
| *G06N 20/00* | (2019.01) |
| *G10L 15/10* | (2006.01) |
| *G10L 15/183* | (2013.01) |
| *G10L 15/22* | (2006.01) |

(52) U.S. Cl.
CPC ............ *G10L 15/063* (2013.01); *G06N 20/00* (2019.01); *G10L 15/10* (2013.01); *G10L 15/183* (2013.01); *G10L 15/1815* (2013.01); *G10L 15/22* (2013.01); *G10L 15/1822* (2013.01)

(58) Field of Classification Search
CPC ..................... G10L 15/1822; G10L 15/1815
See application file for complete search history.

(56) References Cited

U.S. PATENT DOCUMENTS

| | | | |
|---|---|---|---|
| 2018/0157638 A1* | 6/2018 | Li | ............................ G06N 3/08 |
| 2018/0247648 A1 | 8/2018 | Nadimpalli et al. | |
| 2019/0156198 A1 | 5/2019 | Mars et al. | |
| 2019/0272479 A1 | 9/2019 | Mars et al. | |
| 2019/0294675 A1* | 9/2019 | Sapugay | ................. G06F 40/30 |
| 2019/0294676 A1* | 9/2019 | Sapugay | ................. G10L 15/22 |
| 2020/0057946 A1* | 2/2020 | Singaraju | ............... G06N 5/022 |

(Continued)

*Primary Examiner* — Matthew H Baker
(74) *Attorney, Agent, or Firm* — Brian R. Galvin; Galvin Patent Law LLC

(57) ABSTRACT

A system and method for automating the training of enterprise customer response systems using a range of dynamic or generic data sets, used to gradually take human supervision and intervention out of the training process for enterprise WA and similar automated response engines, by training existing machine learning models or engines using a heuristic middleman annotation assistant that helps map generic/public/new datasets to the existing machine learning model or engine, and allowing for limited human oversight over the remaining unknown or badly classified data segments which is used to further teach the heuristic and classification model until the human oversight is no longer needed for the heuristic to learn and map newer datasets, thereby reducing human, dollar, and time costs, and improving automated response system efficiency.

12 Claims, 17 Drawing Sheets

(56) References Cited

U.S. PATENT DOCUMENTS

| | | | |
|---|---|---|---|
| 2020/0074984 A1* | 3/2020 | Ho | G06F 40/30 |
| 2021/0004441 A1* | 1/2021 | Sapugay | G06F 16/3329 |
| 2021/0004537 A1* | 1/2021 | Sapugay | G06F 16/3329 |

* cited by examiner

Annotation assistant inspects and recommends intent for utterance based on semantic similarity, in sub-process
730

Perform semantic similarity check between caller utterance and all training phrases
810

Identify intent(s) that have training phrases semantically similar to the caller utterance
820

Recommend top $n$ intents identified
830

Best matching intent selected by annotator to reinforce in new agent
840

Fig. 8

SYSTEM AND METHOD FOR AUTOMATING THE TRAINING OF ENTERPRISE CUSTOMER RESPONSE SYSTEMS USING A RANGE OF DYNAMIC OR GENERIC DATA SETS

CROSS-REFERENCE TO RELATED APPLICATIONS

| Application No. | Date Filed | Title |
| --- | --- | --- |
| Current application | Herewith | A SYSTEM AND METHOD FOR AUTOMATING THE TRAINING OF ENTERPRISE CUSTOMER RESPONSE SYSTEMS USING A RANGE OF DYNAMIC OR GENERIC DATA SETS Claims benefit of, and priority to: |
| 63/035,506 | Jun. 5, 2020 | SYSTEM AND METHOD FOR AUTOMATING THE TRAINING OF ENTERPRISE CUSTOMER RESPONSE SYSTEMS USING A RANGE OF DYNAMIC OR GENERIC DATA SETS | the entire specification of each of which is incorporated herein by reference.

BACKGROUND

Field of the Art

The disclosure relates to the field of natural language processing, and more particularly to the field of automated response system training.

Discussion of the State of the Art

Currently, there is a severe limitation on virtual agents such as Interactive Voice Response ("IVA") systems for enterprise contact centers, in that the ability to train an WA to understand user intent and desires is severely limited by both the specific agent system being used, and the datasets available for a specific enterprise, which in most cases is manually curated, supervised, and annotated for the system to be able to properly ingest. This results in many man-hours and a large amount of cash being bled from the enterprise as they simply begin to set up their automated interaction system, because there is no effective, generalized, multi-platform, automated system for accomplishing this task.

SUMMARY

Accordingly, the inventor has conceived and reduced to practice, a system and method for automating the training of enterprise customer response systems using a range of dynamic or generic data sets, used to gradually take human supervision and intervention out of the training process for enterprise WA and similar automated response engines, by training existing machine learning models or engines using a heuristic middleman annotation assistant that helps map generic/public/new datasets to the existing machine learning model or engine, and allowing for limited human oversight over the remaining unknown or badly classified data segments which is used to further teach the heuristic and classification model until the human oversight is no longer needed for the heuristic to learn and map newer datasets, thereby reducing human, dollar, and time costs, and improving automated response system efficiency.

According to one aspect, a system for automating the training of enterprise virtual agents using a range of dynamic or generic data sets, comprising: an annotation assistant comprising at least a machine learning model, a first plurality of programming instructions stored in a memory of, and operating on at least one processor of, a computing device, wherein the first plurality of programming instructions, when operating on the at least one processor, cause the computing device to: receive data from a plurality of verbal utterance datasets, wherein the data comprises a plurality of verbal utterances; embed a plurality of user intention vectors in the received data to produce an utterance model, wherein each of the plurality of embedded user intention vectors is associated with a verbal utterance and is produced using previously-stored association data between an utterance and an intention; receive annotated new verbal utterance data from an uncertainty classifier; calculate a confidence index for the annotated new verbal utterance data, wherein the confidence index indicates a degree of confidence in the annotations in the annotated new verbal utterance data; if the confidence index is above a threshold value, incorporate the annotated new verbal utterance data into the utterance model; and send the utterance model to an automated virtual agent; and an uncertainty classifier comprising at least a second plurality of programming instructions stored in a memory of, and operating on at least one processor of, a computing device, wherein the second plurality of programming instructions, when operating on the at least one processor, cause the computing device to: receive new verbal utterance data from an automated virtual agent; compare known verbal utterance data and user intention vectors, to new verbal utterance data with unknown or unclassified user intention vectors, the comparison comprising a plurality of semantic comparison operations; use a heuristic to derive similarity and uncertainty index values for the unknown or unclassified user intention vectors; annotate at least a portion of the new verbal utterance data, to embed a plurality of user intention vectors, wherein for each of the plurality of user intention vectors the similarity index value is greater than the uncertainty index value; and send the annotated new verbal utterance data to the annotation assistant, is disclosed.

According to another aspect, a method for automating the training of enterprise customer response systems using a range of dynamic or generic data sets, comprising the steps of: receiving data from a plurality of verbal utterance datasets, using an annotation assistant; embedding a plurality of user intention vectors in the received data to produce an utterance model, wherein each of the plurality of embedded user intention vectors is associated with a verbal utterance and is produced using previously-stored association data between an utterance and an intention; receiving annotated new verbal utterance data from an uncertainty classifier, using the annotation assistant; calculating a confidence index for the annotated new verbal utterance data, wherein the confidence index indicates a degree of confidence in the annotations in the annotated new verbal utterance data, using the annotation assistant; if the confidence index is above a threshold value, incorporating the annotated new verbal utterance data into the utterance model, using the annotation assistant; sending the utterance model to an automated virtual agent, using the annotation assistant; receiving new verbal utterance data from an automated virtual agent, using an uncertainty classifier; comparing known verbal utterance data and user intention vectors, to new verbal utterance data with unknown or unclassified user intention vectors, the comparison comprising a plurality of semantic comparison operations, using an uncertainty classifier; using a heuristic to derive similarity and uncertainty index values for the unknown or unclassified user intention vectors, using the uncertainty classifier; annotating at least a portion of the new verbal utterance data, to embed a plurality of user intention vectors, wherein for each of the plurality of user intention vectors the similarity index value is greater than the uncertainty index value; sending the annotated new verbal utterance data to the annotation assistant, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a method diagram illustrating the recommendation by an annotation assistant and uncertainty classifier of a semantically similar intent to the unidentified utterance.

DETAILED DESCRIPTION

Figure 1:
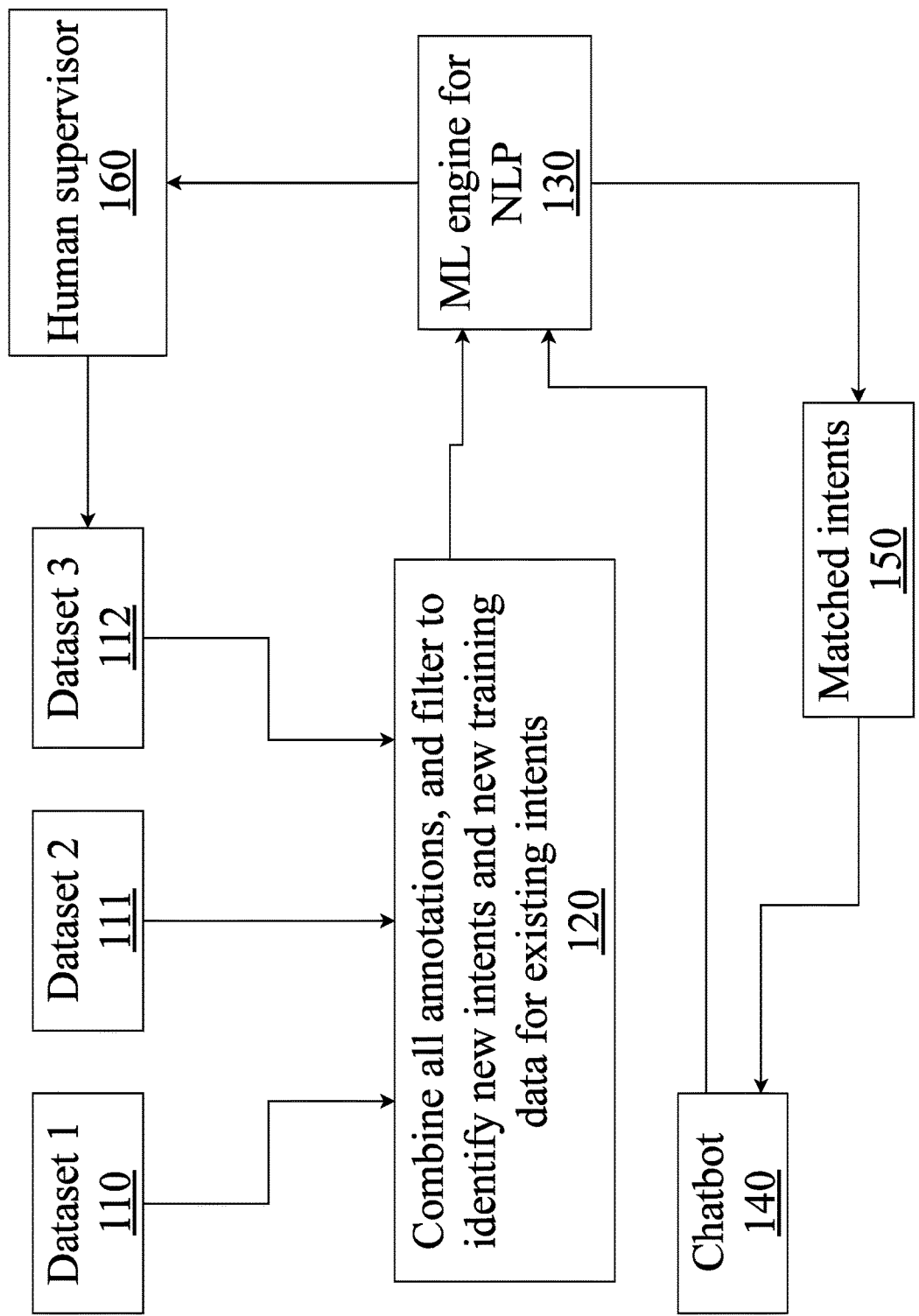
FIG. 1 (PRIOR ART) is a block diagram illustrating a system used to train a machine learning model with human-supervised and annotated utterances.

The inventor has conceived, and reduced to practice, a system and method for automating the training of enterprise customer response systems using a range of dynamic or generic data sets.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

Conceptual Architecture

FIG. 1 (PRIOR ART) is a block diagram illustrating a system used to train a machine learning model with human-supervised and annotated utterances. A plurality of datasets 110, 111, 112 exist, which may be hand-crafted, manually selected, or otherwise supervised or designed for input into a machine learning ("ML") engine for teaching and determining user intents, each dataset containing an utterance (either verbal or textual), an annotation denoting the intent or semantic meaning of the utterance or string of utterances for multi-utterance phrases, and possibly some non-annotated utterance data, may be combined 120 to be fed into a machine learning engine for natural language processing ("NLP") 130. Such a machine learning engine may be for instance, similar to ones used by CLINC™, whereby input from a chatbot 140 is sent to the machine learning engine 130 after data has been fed into the engine 120, 130 for training purposes, and a user's utterances may be matched 150 to intents that have been learned and identified by the engine. Any failed utterances that could not be identified as having a specific intent from the chatbot or user 140 are sent to a human supervisor 160 which then may manually annotate and give an intent value to the utterance or utterances, which are then sent back into a dataset 112 to be re-entered into the engine for learning once more 120, 130. This process requires constant human intervention or supervision for new intents to be learned throughout the lifetime of the system.

Figure 2:
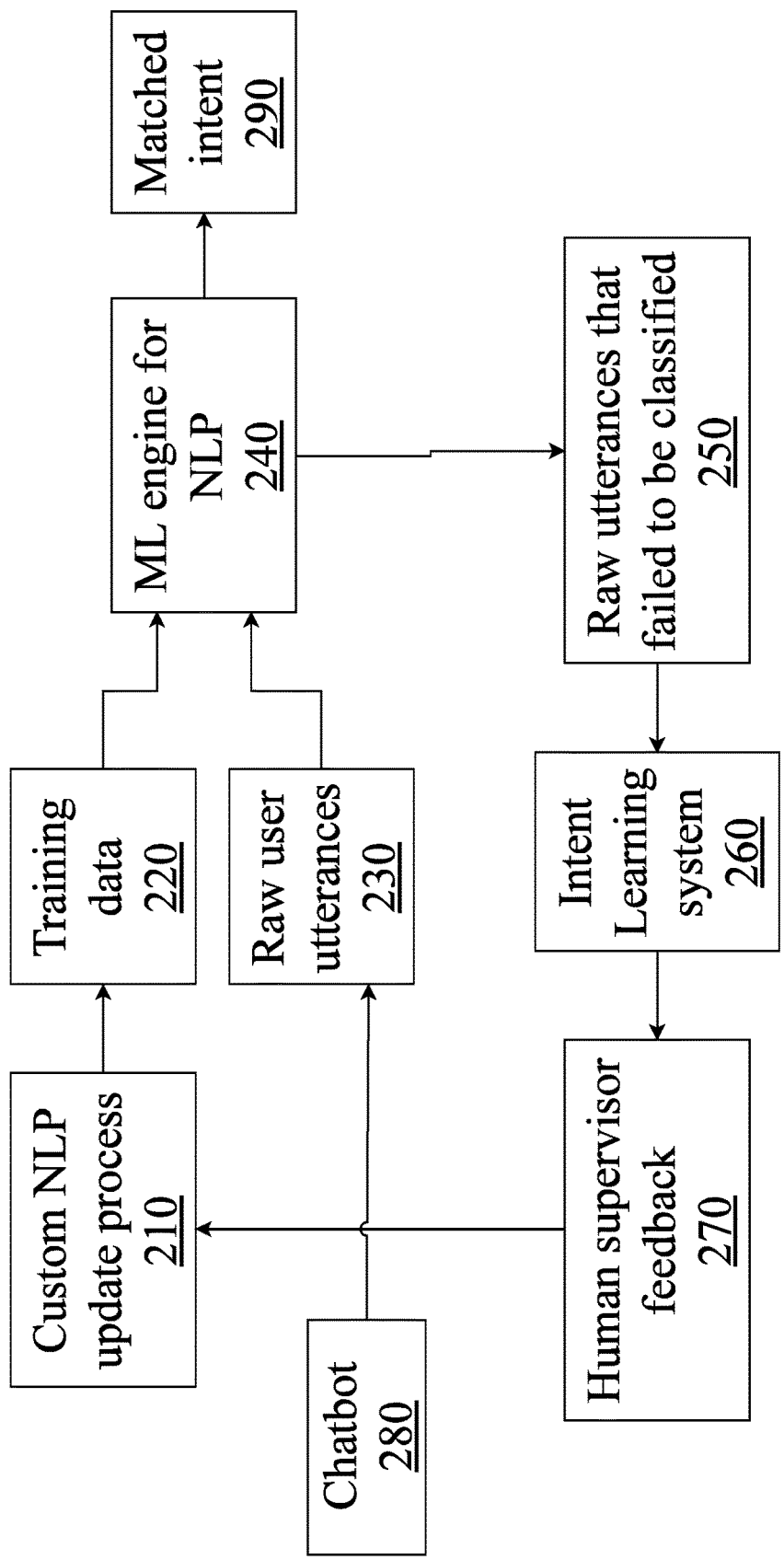
FIG. 2 (PRIOR ART) is a block diagram illustrating a system that allows users to accept or reject newly identified intents that are not identified by a machine learning model, to allow the user intervention to help train on new datasets to identify new intents from user utterances.

FIG. 2 (PRIOR ART) is a block diagram illustrating a system that allows users to accept or reject newly identified intents that are not identified by a machine learning model, to allow the user intervention to help train on new datasets to identify new intents from user utterances. Training date 220 is fed into a machine learning engine for natural language processing 240, much like in FIG. 1, to allow the engine to learn how to match utterances with intents, based on annotated data and intent vectors embedded in the data. A chatbot 280 then captures raw user utterances 230, such as during a conversation, and feeds them into the ML engine 240 to be classified, for the chatbot and for data recording purposes to be able to adequately identify and respond to a user's utterances. The machine learning engine 240 may either produce a matched intent 290 or filter out the raw utterances that have failed to be adequately classified by the engine 250, for a separate learning system to attempt to discern what the utterances might best be classified as, if other data sets have bene made available to the intent learning system 260 that encompass the previously failed utterances. If any utterances are assigned a new intent vector, a human supervisor then may make alterations or "OK" the assignments 270, while an update process 210 makes modifications to the training data 220 used to train the ML engine 240 using a custom process for a given set of training data, or a generic process if training data is all formatted identically and does not need to be accommodated specially. This process requires constant human intervention or supervision for new intents to be learned throughout the lifetime of the system.

Figure 3:
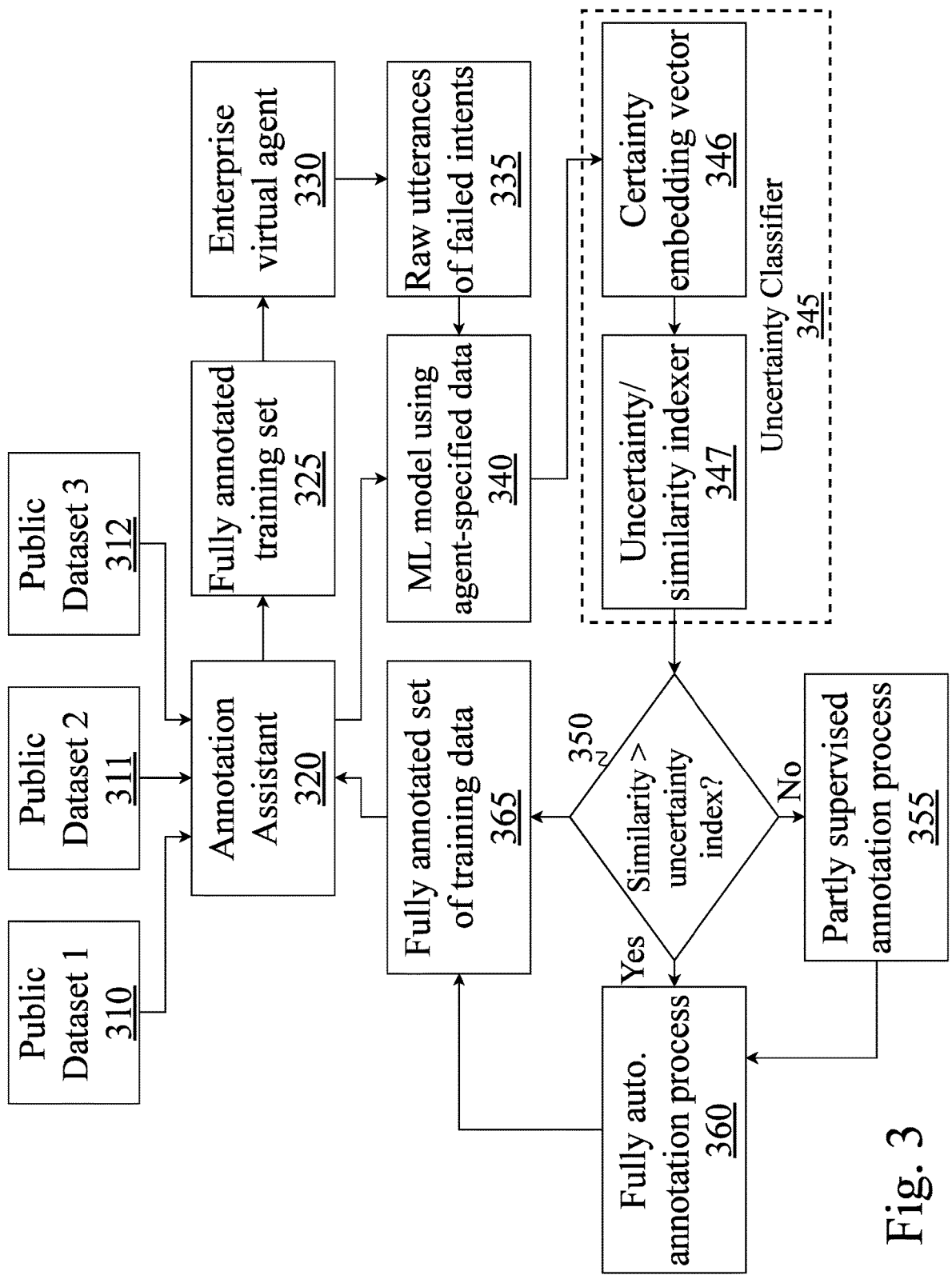
FIG. 3 is a system diagram illustrating the use of an annotation assistant in translating generic datasets to a form recognizable by an enterprise virtual agent, and refining such a translation model using machine learning and limited human supervision, according to a preferred aspect of the invention.
Figure 4:
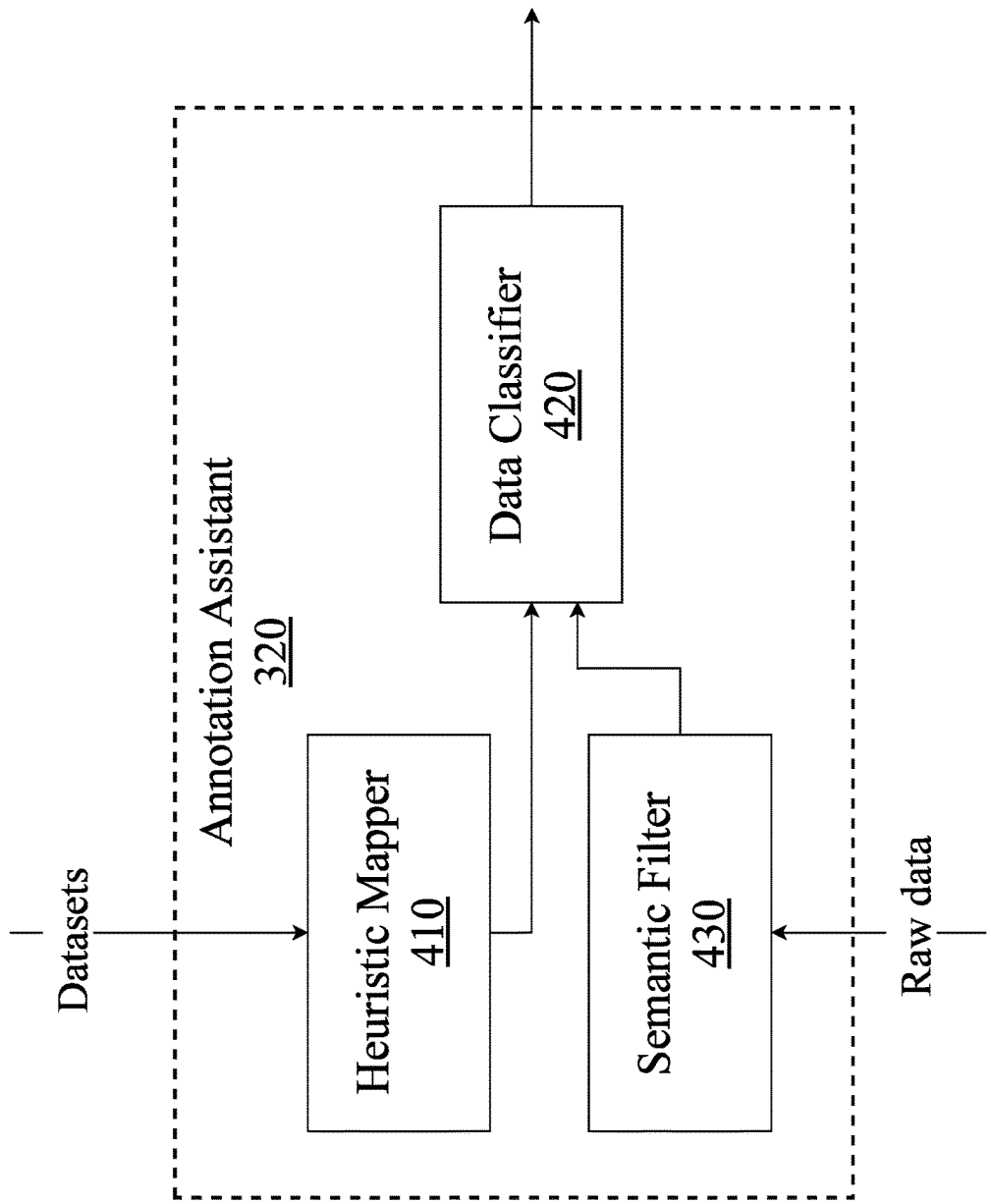
FIG. 4 is a system diagram illustrating internal components to an annotation assistant, according to an aspect of the invention.

FIG. 3 is a system diagram illustrating the use of an annotation assistant in translating generic datasets to a form recognizable by an enterprise virtual agent, and refining such a translation model using machine learning and limited human supervision, according to a preferred aspect of the invention. At least one dataset, and potentially a plurality of datasets 310, 311, 312, may be publicly available, generic datasets of user utterances and phrases, which are queried by or streamed into an annotation assistant 320. An annotation assistant is a piece of software containing several components as illustrated in FIG. 4, that is used to help automatically interpret public or generic datasets for an enterprise virtual agent 330 by annotating the data 325, and communicating with an uncertainty classifier 345 to classify unknown utterances that cannot be intent-classified 335, through the use of a machine learning model that is tailored to or identical with the one used in the virtual agent 330, 340. This training or annotating of utterances, where possible, as well as the failed utterances, are then transmitted or streamed to a certainty embedding vector 346 of an uncertainty classifier 345, which embeds a certainty value to utterances that are deemed to be at all similar semantically to a value for which an intent is identified or suspected of existing, for instance an utterance may be semantically similar to a successfully identified utterance, and then a third utterance may be similar to the first, and therefore have a "second order" similarity to the properly identified utterance, which may add some certainty to its identification, but less than would be added for a first-order similarity. The value of the certainty/uncertainty vector for each utterance is then indexed by an uncertainty-similarity indexer 347, which indexes utterances according to their uncertainty value compared to a similarity value. If the similarity index is not higher than the uncertainty index 350, a human may partially supervise 355 an annotation process by which utterances are identified with intents based on their semantic similarities 360, whilst if the similarity index is higher than the uncertainty index to begin with 350, the automated process takes place without any human supervision or interference 360. A similar confidence index may be calculated for a set of annotated data, describing confidence in the annotations within. If the confidence index is above a threshold value, this indicates that the set of annotated data is an improvement to the current model, and it is incorporated into the model. The confidence threshold value may be adjustable, for example either via manual adjustment by an administrator user or by automatically adjusting the threshold value based on previous sets of data. For example, a previous set's confidence index may be used as a threshold for a new set (so the that new set must have equal-or-greater confidence than the previous one), or the threshold may be adjusted to fit a calculated value based on multiple previous sets such as (for example) the mean, median, minimum, maximum, or standard deviation in confidence index of a number of data sets. For example, if a confidence threshold is initially set to a value of 0.75 and several data sets in a row have each had a confidence index of 0.90 or greater, the confidence threshold may be raised to ensure an outlying set (one above the original value of 0.75 but significantly below the trending confidence values seen in the previous sets) does not get incorporated and risk polluting the model. After this occurs, the fully annotated set of training data 365 is sent to the annotation assistant 320 to use to send to the virtual agent 330, and train the machine learning model 340, so as to reduce the number of, or eliminate all of, the previously failed utterances, and achieve a higher success rate with minimal human involvement.

As the system continues to learn and identify, and correlate, new utterances and intents, it will require less and less human supervision, until ideally none is required, due to the web of semantically similar utterances growing to encompass a large amount of generic phrases, to achieve higher accuracy and versatility than existing systems.

FIG. 4 is a system diagram illustrating internal components to an annotation assistant, according to an aspect of the invention. An annotation assistant 320 receives data from a single dataset, or plurality of datasets, which is received by a heuristic mapper 410 software engine. The heuristic mapper software 410, and a semantic filter 430 and data classifier 420, may all be written in one of many different programming languages, and need not all be written in the same programming languages or paradigms, including Object Oriented Programming ("OOP"), C#™, JAVA™, PYTHON™, ERLANG™, or others. A heuristic mapper 410 may map data from user utterances as received by datasets, to intents, with the use of a data classifier 420 for classifying the data specially for a specified automated agent system. In this way, the heuristic mapper 410 maps raw intents to raw utterances, while the data classifier 420 translates and classifies these intents and utterances to the format and specifications used by the connected ML automated agent. A semantic filter 430, however, may receive data from raw data output by such a machine learning automated agent, in the event there is data that has not been adequately understood by the automated agent. The semantic filter 430 may receive this data, and identify semantically similar utterances between unclassified or "failed" utterances, and successfully classified utterances, in this way performing as a sanity check and uncertainty classifier according to this embodiment, for the annotation assistant. Semantic analysis of phrases may include analyzing the occurrence of words in similar patterns, phrases that refer to the same objects or that use similar verbs, similar sounding or intonation phrases and utterances, and more, to identify possibly similar intents between utterances that have already been satisfactorily identified and those that have not yet been so identified.

Detailed Description of Exemplary Aspects

Figure 5:
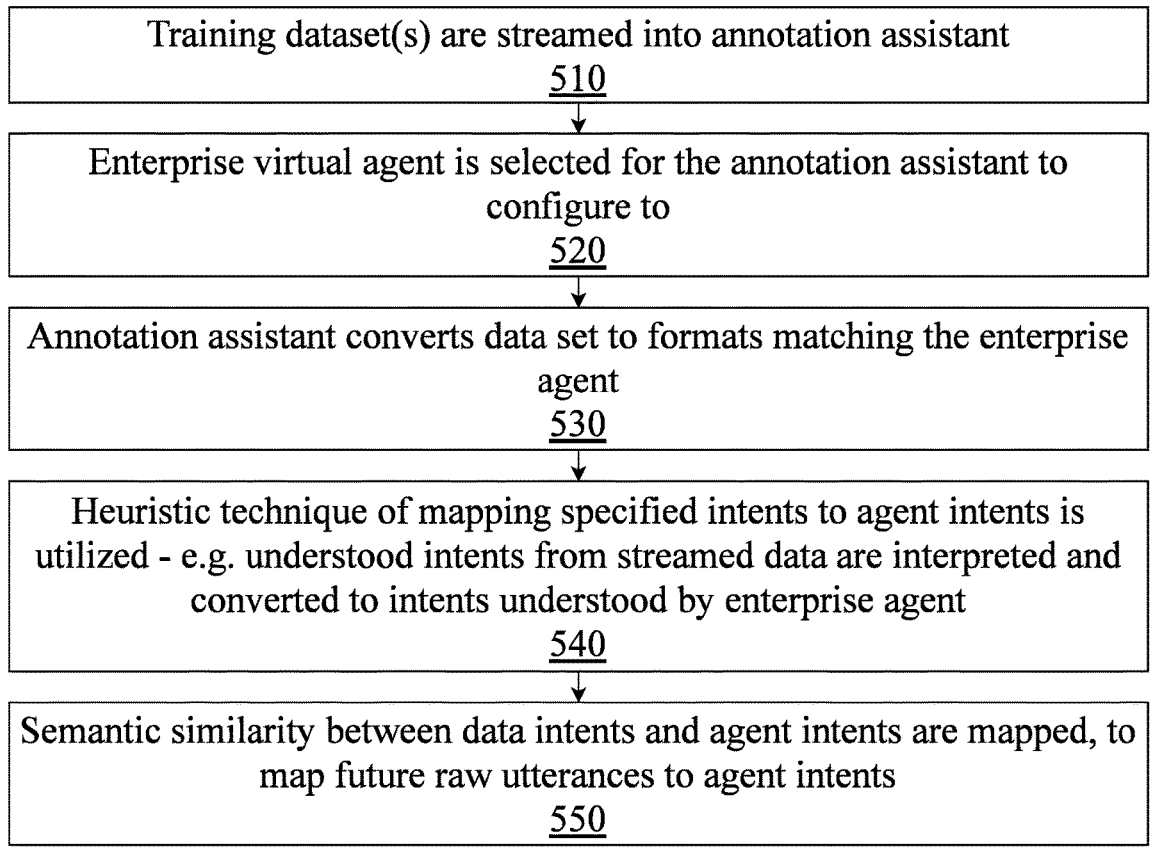
FIG. 5 is a method diagram illustrating the process of generic datasets being used by an annotation assistant to heuristically map semantically similar utterances and phrases to intents understood by a connected machine learning model for an enterprise agent, according to an aspect of the invention.

FIG. 5 is a method diagram illustrating the process of generic datasets being used by an annotation assistant to heuristically map semantically similar utterances and phrases to intents understood by a connected machine learning model for an enterprise agent, according to an aspect of the invention. A single training dataset or plurality of datasets are streamed into an annotation assistant 510, either by a query from the annotation assistant, or from the datasets being streamed into the system from a separate service or application altogether, or from being manually fed into the annotation assistant by a human supervisor, user, or administrator. Datasets of this manner may be digital information representing verbal utterances such as those gathered from calls or recordings of public interactions, or textual utterances from text chat between individuals and either other individuals or chatbot systems. An enterprise virtual agent is selected for the annotation assistant to configure to 520, such as a CLINC™ system or some other specific system, at which point the annotation assistant may convert the streamed data from the datasets to formats matching the enterprise agent 530. The intents of users based on utterances received may be heuristically mapped to specified intents the specified agent is designed to handle, so that e.g. understood intents from streamed data are interpreted and converted to intents understood by enterprise agent 540 for identical or similar intents. For instance, a generic intent of "speak with manager" may be mapped to an intent for a specific automated agent, as "speak with representative," if there is no "speak with manager" intent that the automated agent is equipped to handle, and the two intents are deemed similar or identical in nature. For utterances that may not have immediately identifiable and classifiable intents, semantic similarity between data with specified intent vectors and utterances without specified intent vectors are mapped, to map future raw utterances to agent intents 550. So for instance, if an utterance does not match a specified intent vector, but is 80% semantically similar to an utterance that has a confidently mapped intent vector, the unknown utterance may be assigned an 80% confidence or similarity index and the intent of the similar utterance, to extent the automated agent to utterances that would not normally be able to be handled without human supervision and annotation.

Figure 6:
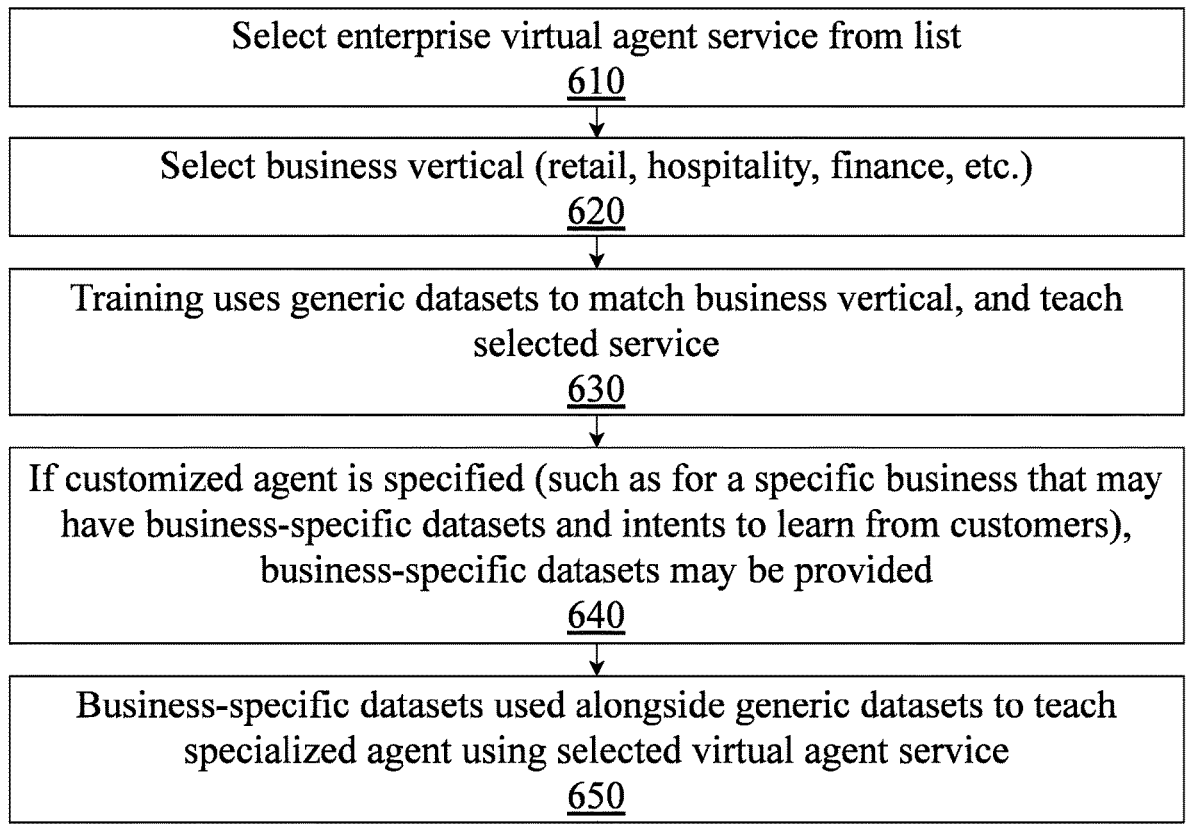
FIG. 6 is a method diagram illustrating the process using generic datasets from a specific business vertical such as retail or finance, and optionally a specific dataset or datasets from a specific business or industry such as COSTCO™-specific datasets of user utterances and intents, to build and automatically train an enterprise virtual agent.

FIG. 6 is a method diagram illustrating the process using generic datasets from a specific business vertical such as retail or finance, and optionally a specific dataset or datasets from a specific business or industry such as COSTCO™-specific datasets of user utterances and intents, to build and automatically train an enterprise virtual agent. A human user or administrator may select an enterprise virtual agent service from a list of supported virtual agents 610, such as a BOOST.AI™ system or some other specific system, and may also select a business vertical such as retail, hospitality, finance, or others 620, with which specific intents, phrases, and datasets may be available or desired, and may be formatted or mapped differently for different machine learning automated response systems. In this embodiment, training such an automated response system may use only generic datasets to match the business vertical, and teach the selected automated response service 630, so that, for instance, generic datasets of users calling a contact center and communicating with an Intelligent Virtual Agent ("WA") to discuss cable bills, will not be used to train an WA (a specific type of an automated response system) that is designed to handle financial inquiries for a stock broker, or a system that is designed and meant to handle customers for retail shipping questions. If a customized agent is specified (such as for a specific business that may have organization-specific datasets and intents to learn from customers), business-specific datasets may be provided 640, such as an WA for COSTCO™ which may need to use datasets and user intention vectors specific to their business, such as for special deals or coupons or products not offered anywhere else in their respective industry or business vertical. Any business-specific datasets, if there are any specified, may be used alongside generic datasets to teach specialized agent using selected virtual agent service 650, so that it may be trained to handle a wide variety of user utterances, including but not limited to those specified by the business itself, and require less—or no—human supervision.

Figure 7:
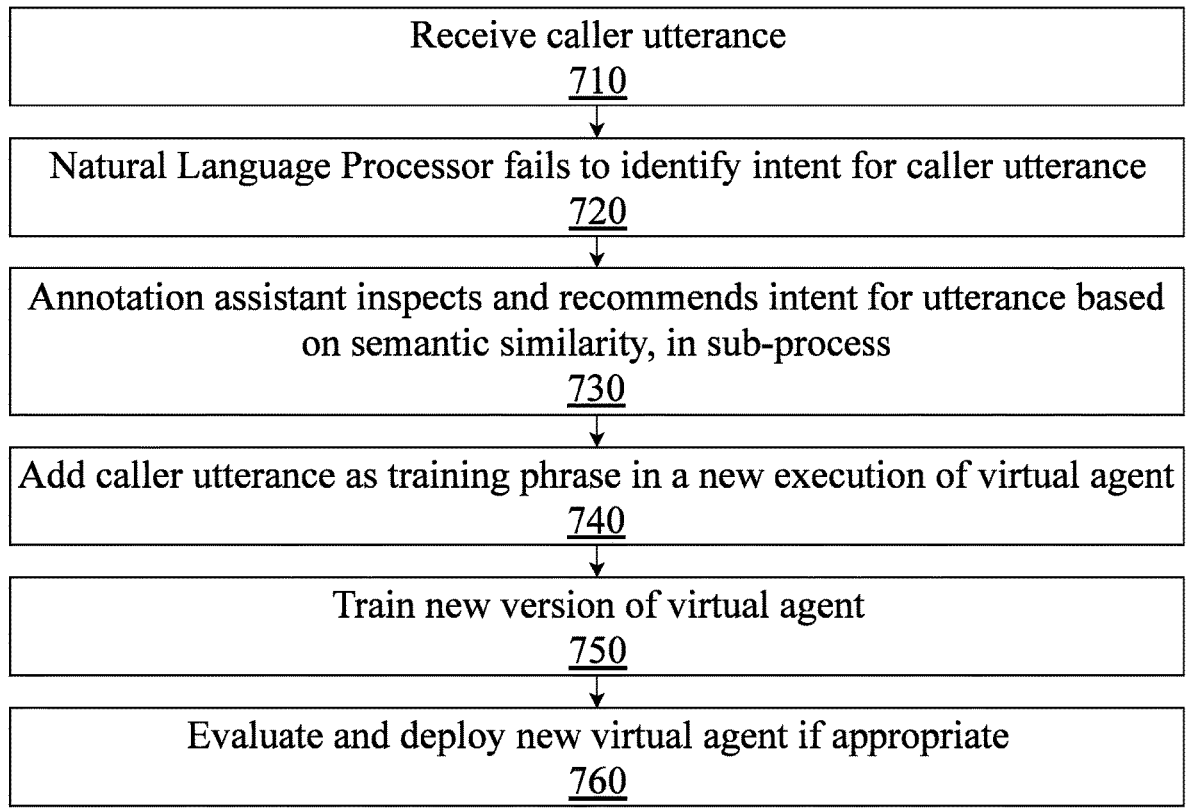
FIG. 7 is a method diagram illustrating the capture of customer utterances that are not able to be identified by a virtual agent, and the creation and deployment of a newly trained agent based on the new data.

FIG. 7 is a method diagram illustrating the capture of customer utterances that are not able to be identified by a virtual agent, and the creation and deployment of a newly trained agent based on the new data. A customer or system tester may call an WA connected to this system, and utter a phrase 710, or alternatively type out a phrase to a chatbot as text, such as on a website with an interactive chatbot for customer service purposes. A natural language processing ("NLP") system such as an WA or chatbot may fail to identify the intent of the caller or chatter, based on their spoken or typed utterance or utterances 720. For instance, the machine learning model that operates such systems may never have encountered such utterances, or the utterances may not be deemed relevant to the system and were missed in some aspect of design or training, or the user may utter or type a malformed phrase which the system was never exposed to (such as when using new slang, or mispronouncing words). An annotation assistant, or an uncertainty classifier if separate from such an annotation assistant, may inspect and recommend intent vectors for any utterances that are not identified and classified by the NLP system, based on semantic similarity, in a sub-process 730 explained in FIG. 8, where the most similar utterance (if any) that does possess an embedded intent vector is used to derive the intent of the unclassified utterance or textual phrase. If any such semantically similar utterances are identified, the annotation assistant or uncertainty classifier may add the user utterance as a new training phrase to be used in a new execution of the virtual agent 740, which may then be trained 750 using the improved datasets and intent vector embeddings, after which point the new agent is evaluated and deployed to the system to replace the old agent, if deemed appropriate in a sub process as shown in FIG. 9, 760.

FIG. 8 is a method diagram illustrating the recommendation by an annotation assistant and uncertainty classifier of a semantically similar intent to the unidentified utterance. An annotation assistant, or an uncertainty classifier if separate from such an annotation assistant, may inspect and recommend intent vectors for any utterances that are not identified and classified by the NLP system, based on semantic similarity 730, by first performing a semantic similarity check between a customer utterance and all classified training phrases 810. Such a semantic similarity check may analyze the use of similar verbs or objects in the sentence structure, such as two utterances referring to "my bill" or "paying," sentence structure and length, and other comparisons between utterances. The annotation assistant or uncertainty classifier then may identify any intent or intents in those training phrases that are semantically similar to the caller utterance 820, which may be for instance a "similarity index" that has a higher value for similar object references in the utterance (such as "my TV bill"), or other semantic similarities, and a lower value for a lack of detected similarities. Of the analyzed intents, the assistant may then recommend a selection of the top-scoring similar utterances and intents 830, the number of which and the manner in which they are scored being able to be modified for each implementation of the system or set by a human administrator for each system. The best-matching utterance and intent is then selected to be used as the template for the unclassified utterance, and the similarity index and intent value are both embedded with the utterance data before being used by the system for the process of training or reinforcing a new agent model 840, or an existing model which may then be improved by the new utterance and intent identification.

Figure 9:
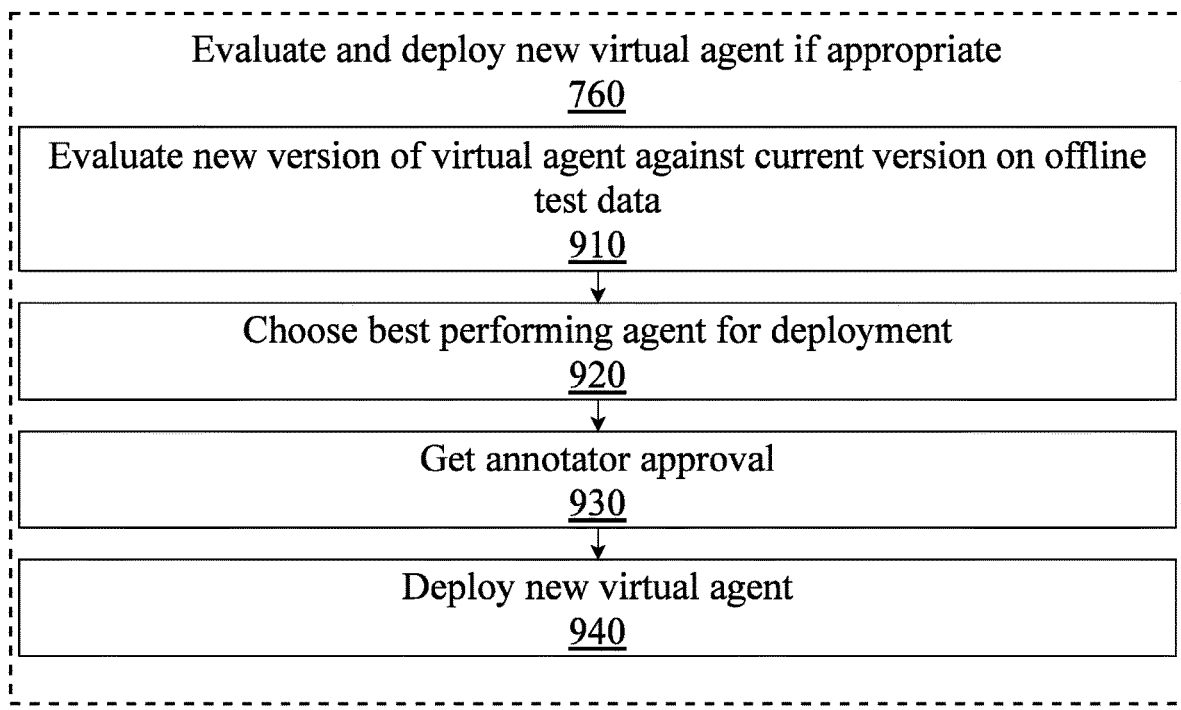
FIG. 9 is a method diagram illustrating the evaluation and deployment of a newly trained virtual agent by an annotation assistant, machine learning model, uncertainty classifier, and either automated supervision or limited human supervision, according to an aspect.

FIG. 9 is a method diagram illustrating the evaluation and deployment of a newly trained virtual agent by an annotation assistant 760, machine learning model, uncertainty classifier, and either automated supervision or limited human supervision, according to an aspect. The annotation assistant will perform a limited evaluation of the new version of the virtual agent against the current version, with offline test data 910, for instance by comparing their responses to specified user utterances that should be handled by the old and new agent to see if the newly trained agent has at least identical capabilities to the older agent generation, and determining if the ML automated response engine responds to the new utterance with the embedded intent. If this occurs, then the new agent is deemed to be at least as good or better than the old generation of automated agent, and may be chosen for deployment 920 and approved by the annotation assistant 930. The approval may be stalled or denied if the new models do not perform at least as well as the old generation agent at responding to user utterances that are known to have given intents, meaning there has been degradation somewhere in the model. If a new model is chosen and approved, it may be deployed 940, by transmitting the new code for the system to the contact center or cloud servers that operate the automated agent, or by sending the model to a separate system for implementation and examination, or to a human supervisor for examination and manual deployment, depending on the implementation of the automated response engine and the specifications of the business customer.

Figure 10:
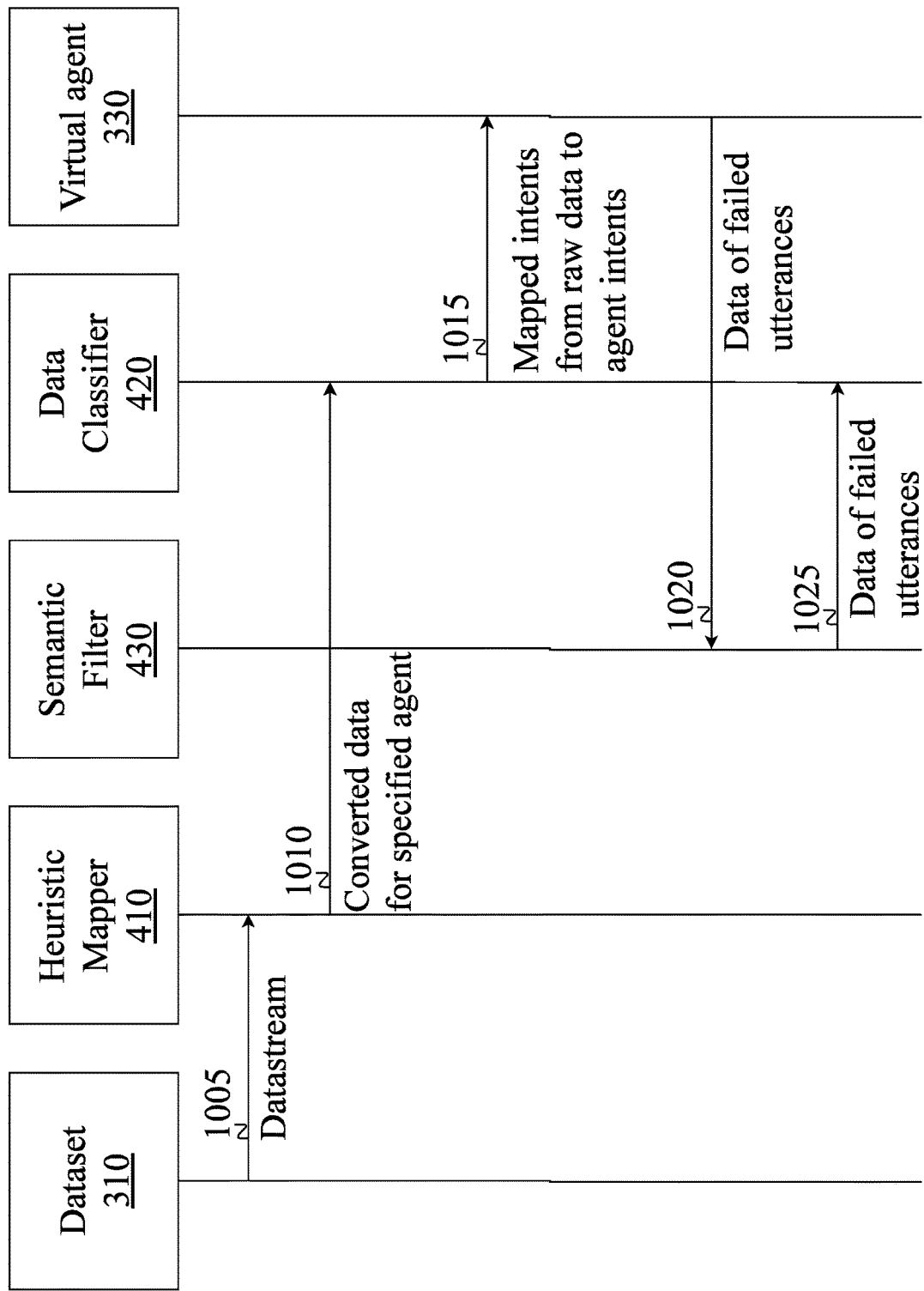
FIG. 10 is a message flow diagram illustrating the process of generic datasets being used by an annotation assistant to heuristically map semantically similar utterances and phrases to intents understood by a connected machine learning model for an enterprise agent, according to an aspect of the invention.

FIG. 10 is a message flow diagram illustrating the process of generic datasets being used by an annotation assistant to heuristically map semantically similar utterances and phrases to intents understood by a connected machine learning model for an enterprise agent, according to an aspect of the invention. In the exchange of messages, there are at least a dataset 310, a heuristic mapper 410, a semantic filter 430, a data classifier 420, and a virtual agent 330. A dataset 310 may be a public, generic, private, specialized, or business-specific set of utterance data, comprising at least the data of the utterances themselves, whether verbal or textual. A heuristic mapper 410, data classifier 420, and semantic filter 430 are software components of an annotation assistant, and may be located on the same computing device, or may be separate services on different computing devices that communicate over a network or other data-sharing connection. A virtual agent 330 is an automated response system that uses machine learning to learn to respond to, and then respond to, customer utterances, such as an WA that handles customer calls in directing their calls to other services or agents in an organization such as a contact center. A data stream 1005 is a stream of data from a dataset 310 to a heuristic mapper 410, potentially sent over a network or accessed on the same computing device as the heuristic mapper 410, which is queried or read by the heuristic mapper 410. A dataset 310 has no capability on its own to transmit itself to a recipient, but may be transmitted by a service or queried and digested by a service or other software, either over a network protocol such as HTTP, TCP/IP, FTP, or by being read as a file if it is locally stored. A data stream 1005 contains utterance data of user utterances, from the dataset 310, and a heuristic mapper 410 then may apply a machine learning model mapping user utterances and their intentions as intent vectors, sending this data to a data classifier 1010, 420, where the data is then classified, reorganized, or otherwise converted to a format that the virtual agent 330 is capable of processing, and sent to the virtual agent 1015. The annotation assistant that operates the heuristic mapper 410, semantic filter 430, and data classifier 420 in this embodiment is configured specially for the virtual agent 330, such that it is able to convert raw utterance and intent data into a format that is understood and processable by the virtual agent 330. Any utterances that do not have an intent vector, or are misunderstood by the virtual agent 330, are sent 1020 to a semantic filter 430, as well as raw utterance data from the entire dataset that the virtual agent 330 has received, so that the semantic filter 430 may determine the similarity between phrases with proper intent vectors and any failed utterances that were not identified with an intent vector, before sending the utterances and any embedded intent vectors, and the semantic similarity and uncertainty indexes for each failed utterance 1025, to a data classifier 420 to be further processed such that failed utterances with a high semantic similarity to successful utterances may have the intent vector of the successful and similar utterance also embedded in the previously failed and unclassified utterance, for future use.

Figure 11:
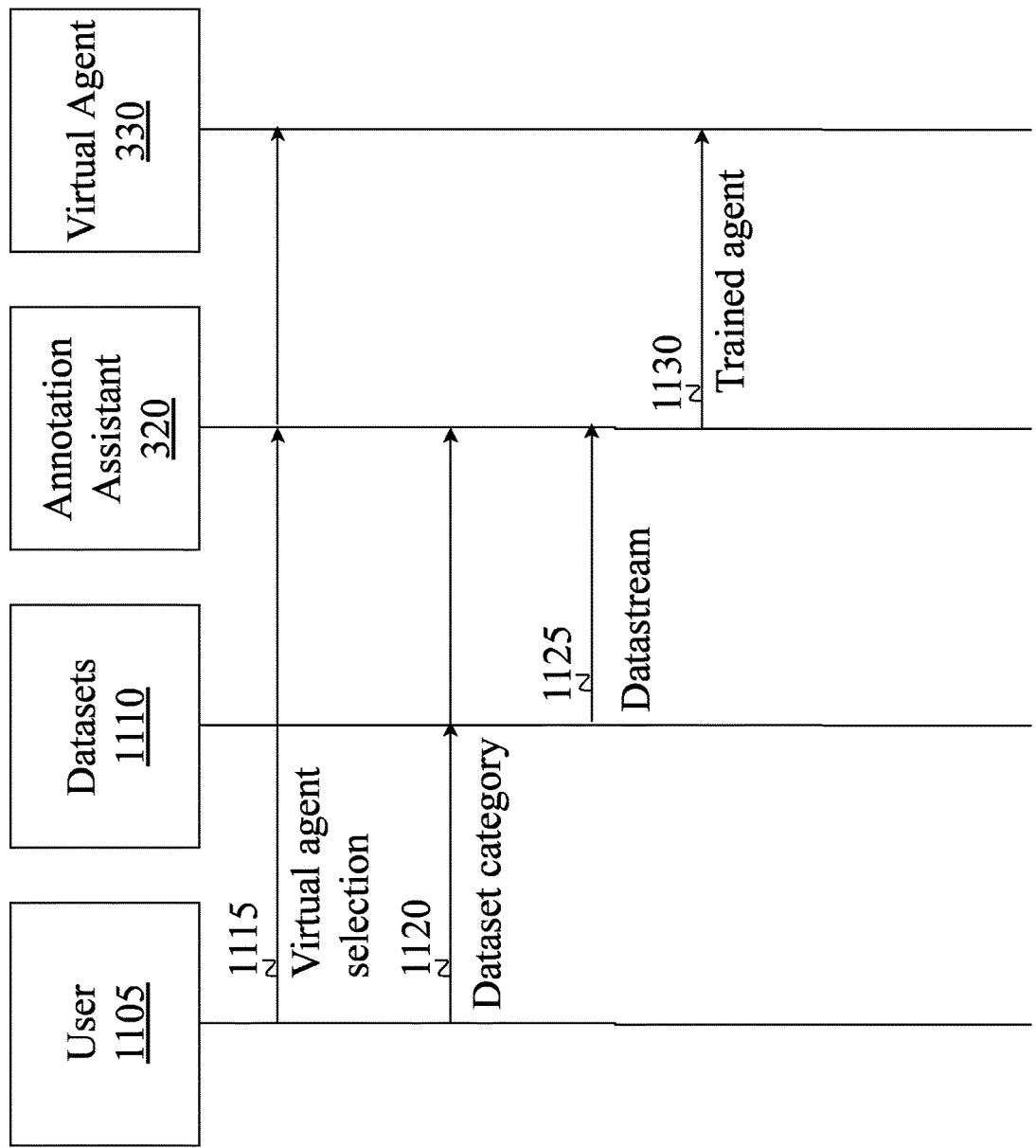
FIG. 11 is a message flow diagram illustrating the process of using generic datasets from a specific business vertical such as retail or finance, and optionally a specific dataset or datasets from a specific business or industry such as COSTCO™-specific datasets of user utterances and intents, to build and automatically train an enterprise virtual agent.

FIG. 11 is a message flow diagram illustrating the process of using generic datasets from a specific business vertical such as retail or finance, and optionally a specific dataset or datasets from a specific business or industry such as COSTCO™-specific datasets of user utterances and intents, to build and automatically train an enterprise virtual agent. In the exchange of messages, there are at least a single or plurality of users 1105, datasets 1110, an annotation assistant 320, and a virtual agent 330. A dataset 1110 may be a public, generic, private, specialized, or business-specific set of utterance data, comprising at least the data of the utterances themselves, whether verbal or textual. A heuristic mapper, data classifier, and semantic filter are software components of an annotation assistant 320, and may be located on the same computing device, or may be separate services on different computing devices that communicate over a network or other data-sharing connection. Such an annotation assistant 320 is used to aid in the automatic annotation and translation of user utterances to a format that a virtual agent 330 is capable of using to interact automatically with customers. A virtual agent 330 is an automated response system that uses machine learning to learn to respond to, and then respond to, customer utterances, such as an WA that handles customer calls in directing their calls to other services or agents in an organization such as a contact center. A user 1105 first may select a virtual agent 330 for the annotation assistant 320 to become configured to work with 1115, which may be as simple as selecting a choice from a drop-down list of agent choices that the annotation assistant 320 is capable of interfacing with. A dataset category is similarly chosen 1120 by a user, if any is desired, which may specify the business vertical of the data to be ingested, and which may determine which datasets 1110 are utilized by the annotation assistant 320 or how they are utilized. A data stream 1125 is a stream of data from a dataset or datasets 1110 to an annotation assistant 320, potentially sent over a network or accessed on the same computing device as the annotation assistant 320, which is queried or read by the annotation assistant 320. A dataset 1110 has no capability on its own to transmit itself to a recipient, but may be transmitted by a service or queried and digested by a service or other software, either over a network protocol such as HTTP, TCP/IP, FTP, or by being read as a file if it is locally stored. A data stream 1125 contains utterance data of user utterances, from the dataset 1110, and a annotation assistant 320 then may apply a machine learning model mapping user utterances and their intentions as intent vectors, classifying and using semantic similarities as previously discussed to re-train a ML automated response system on previously failed utterances, after which point a newly trained agent model may be deployed if it passes an evaluation standard that may be set by a system administrator 1130 or may be specified by the design of the annotation assistant 320 and the agent selection 1115.

Figure 12:
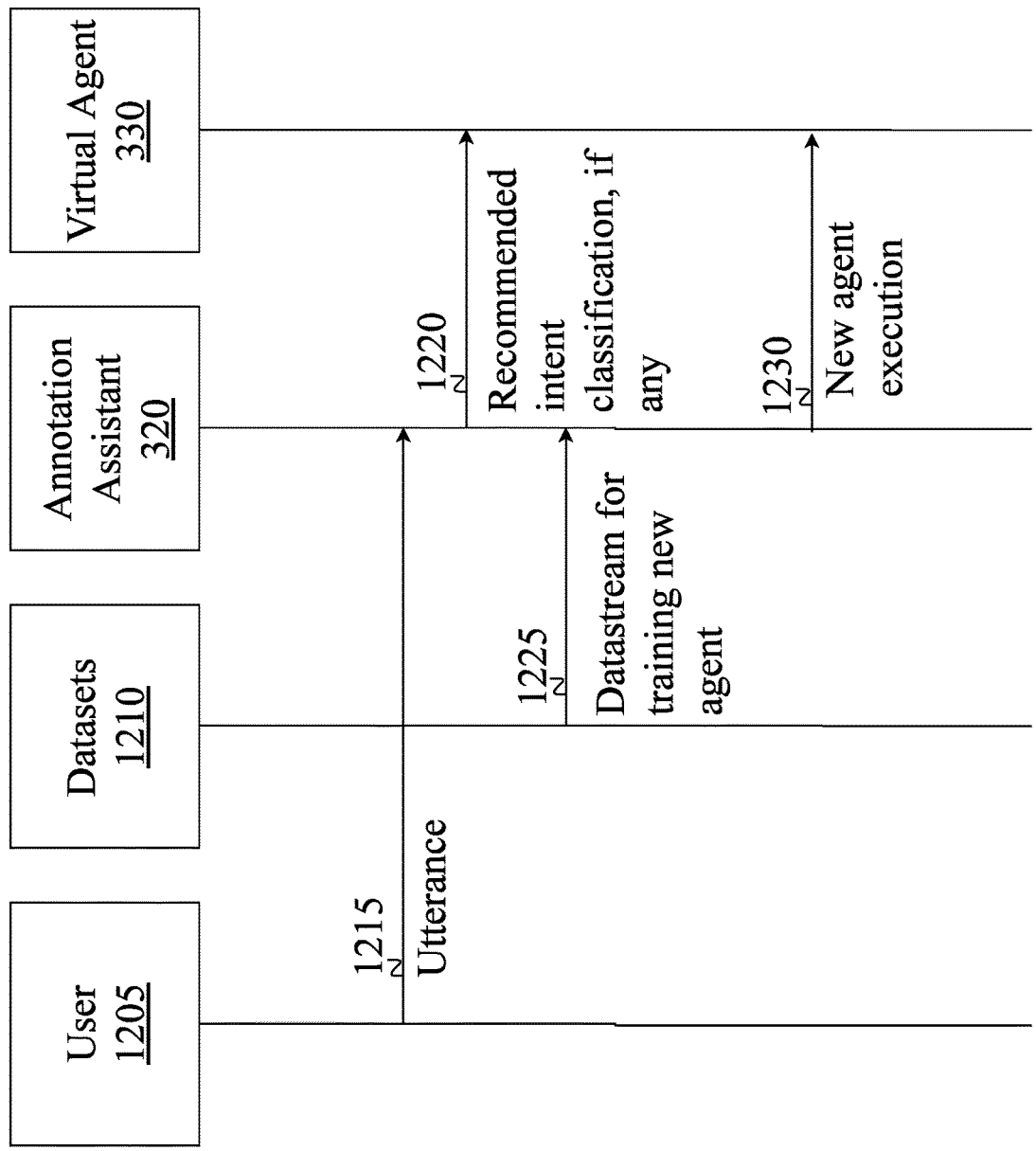
FIG. 12 is a message flow diagram illustrating the capture of customer utterances that are not able to be identified by a virtual agent, and the creation and deployment of a newly trained agent based on the new data.

FIG. 12 is a message flow diagram illustrating the capture of customer utterances that are not able to be identified by a virtual agent, and the creation and deployment of a newly trained agent based on the new data. In the exchange of messages, there are at least a single or plurality of users 1205, datasets 1210, an annotation assistant 320, and a virtual agent 330. A dataset 1210 may be a public, generic, private, specialized, or business-specific set of utterance data, comprising at least the data of the utterances themselves, whether verbal or textual. A heuristic mapper, data classifier, and semantic filter are software components of an annotation assistant 320, and may be located on the same computing device, or may be separate services on different computing devices that communicate over a network or other data-sharing connection. Such an annotation assistant 320 is used to aid in the automatic annotation and translation of user utterances to a format that a virtual agent 330 is capable of using to interact automatically with customers. A virtual agent 330 is an automated response system that uses machine learning to learn to respond to, and then respond to, customer utterances, such as an WA that handles customer calls in directing their calls to other services or agents in an organization such as a contact center. A user may make an utterance 1215 over either verbal or textual communications, depending on the implementation and type of the virtual agent 330 and corresponding setup of the annotation assistant 320, at which point the utterance 1215 may first go to the annotation assistant 320 which provides for an intent classification for the utterance 1220, unlike other methodologies where the agent 330 itself classifies the utterance and the annotation assistant 320 only trains the agent 330. A dataset or datasets 1210 may be queried or otherwise read by the annotation assistant 320, 1225, for the purposes of training a new agent, as shown in FIG. 11, if new datasets or new user utterances become available during execution of the virtual agent 330. The new agent model, once trained, is then executed to replace the old agent 1230. If a new model is chosen and approved, it may be deployed by transmitting the new code for the system to the contact center or cloud servers that operate the automated agent, or by sending the model to a separate system for implementation and examination, or to a human supervisor for examination and manual deployment, depending on the implementation of the automated response engine and the specifications of the business customer. It is also possible for an implementation of the system in which the user utterances 1215 are sent, instead, directly to the virtual agent 330, rather than the annotation assistant 320.

Figure 17:
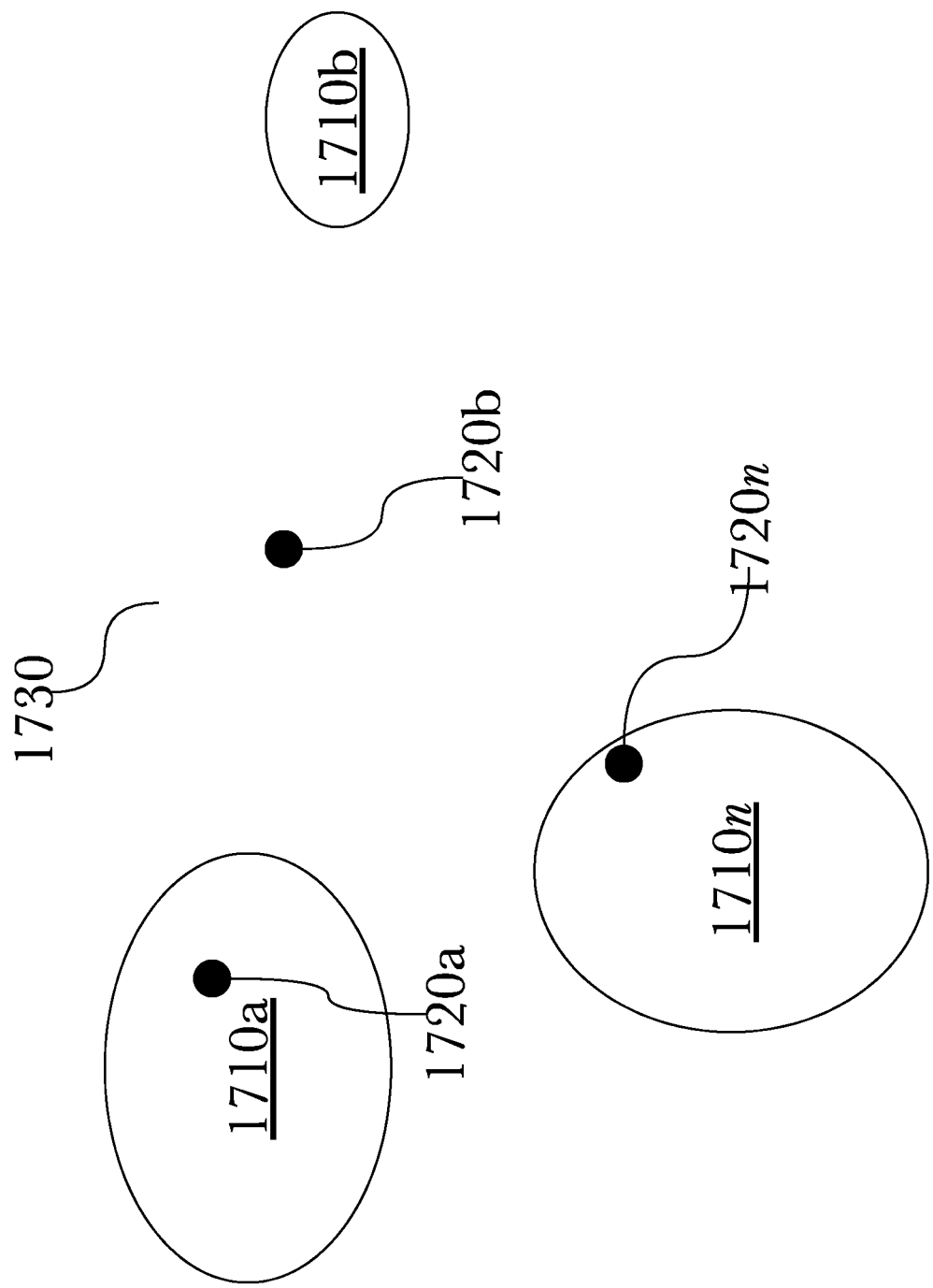
FIG. 17 is a diagram illustrating the use of Euclidian distance to model utterances and determine confidence in cluster matching.

FIG. 17 is a diagram illustrating the use of Euclidian distance to model utterances and determine confidence in cluster matching. Semantic filter 430 may employ the use of Euclidian distance to model information as an n-dimensional representation 1700, wherein utterances and intents may be modeled as distant points 1720a-n or regions 1710a-n. The proximity of any given point in the model 1700 from the center of a region indicates confidence in a clustering match, for example if a particular phrase is clearly indicative of a specific intent the data point for the phrase may be located near the center of a region (as is the case with utterance 1720a) describing that specific intent, while a less-confident match may be near the edge of a region describing an intent (1720n). Model 1700 further includes empty space 1730 between regions, which indicates uncertainty as to how to best match an utterance with an intent, for example if there is a high degree of ambiguity as shown with utterance 1720b, which is ambiguous between regions representing two intents 1710a, 1710b. In cases of such uncertainty, a human user may annotate the data and select the correct intent to adjust the model, or in fully-automated operation the ambiguous data may be assigned to one of the uncertain intents (for example, to engage in A/B testing and/or to try models with different clustering of uncertain intents to observe which outcome is preferable) or may be discarded.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
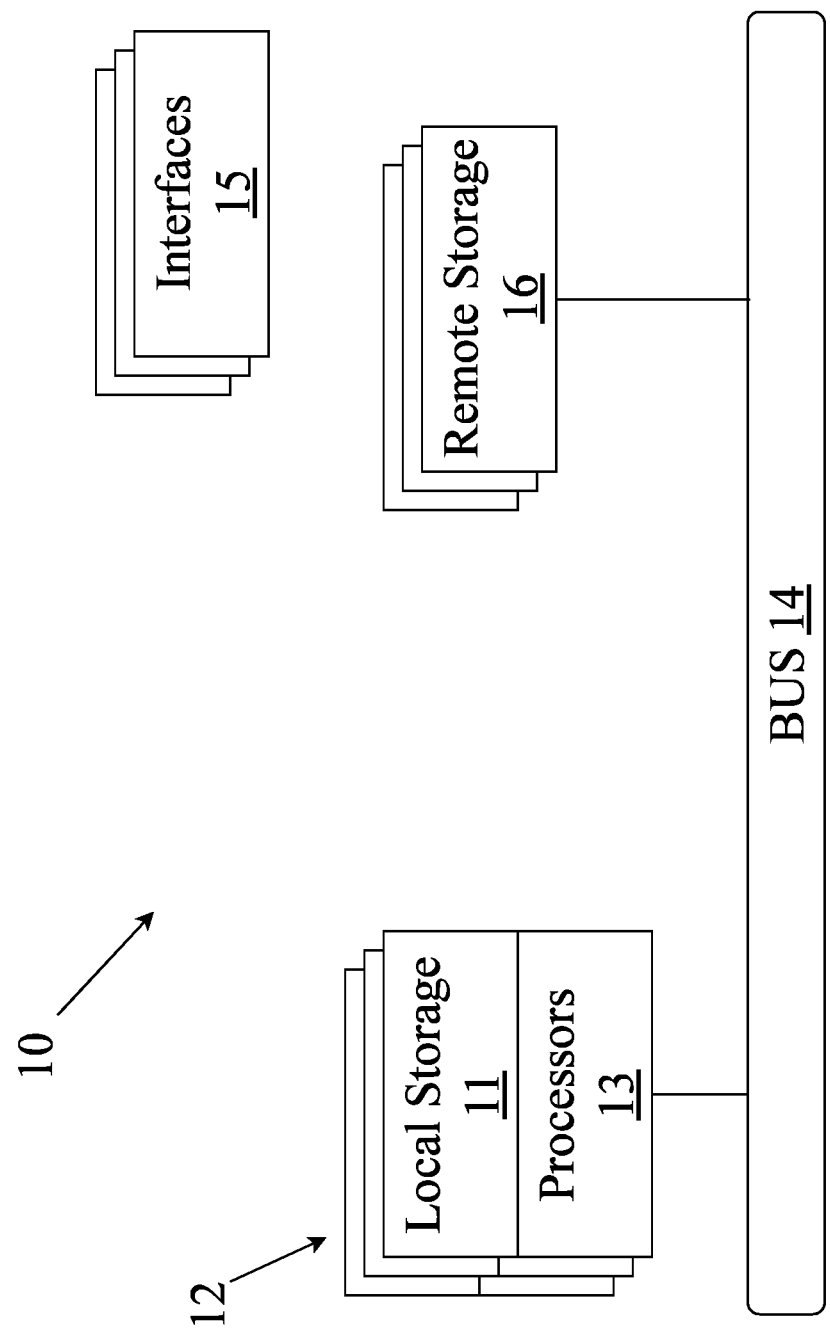
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
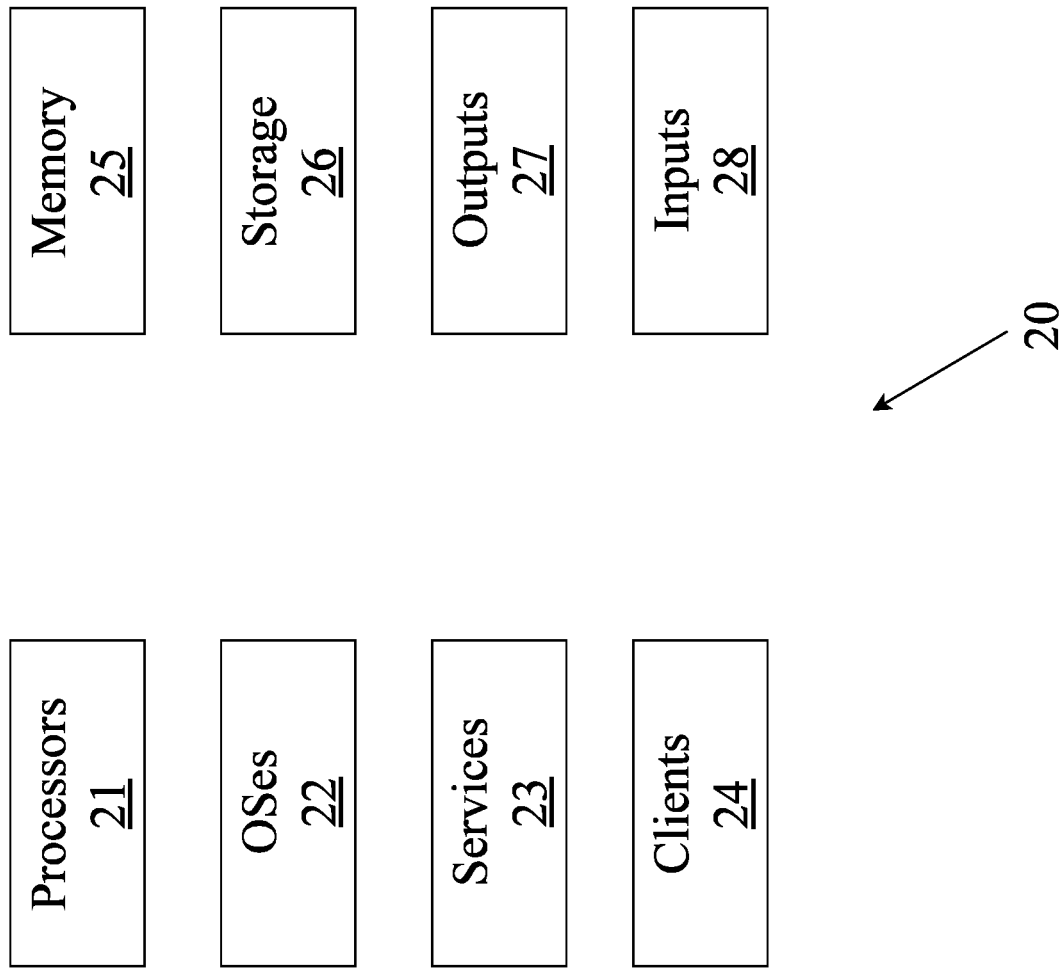
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
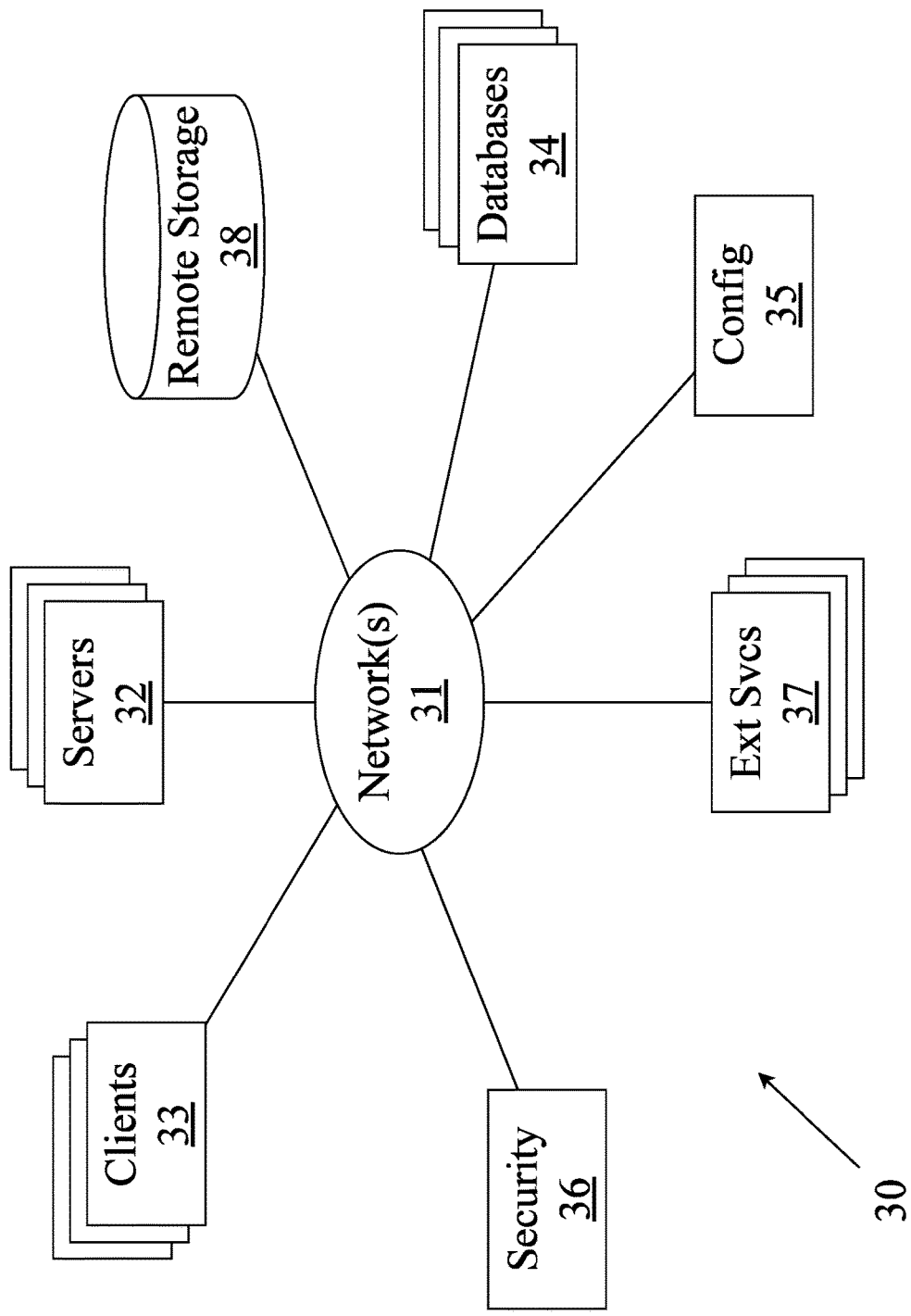
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
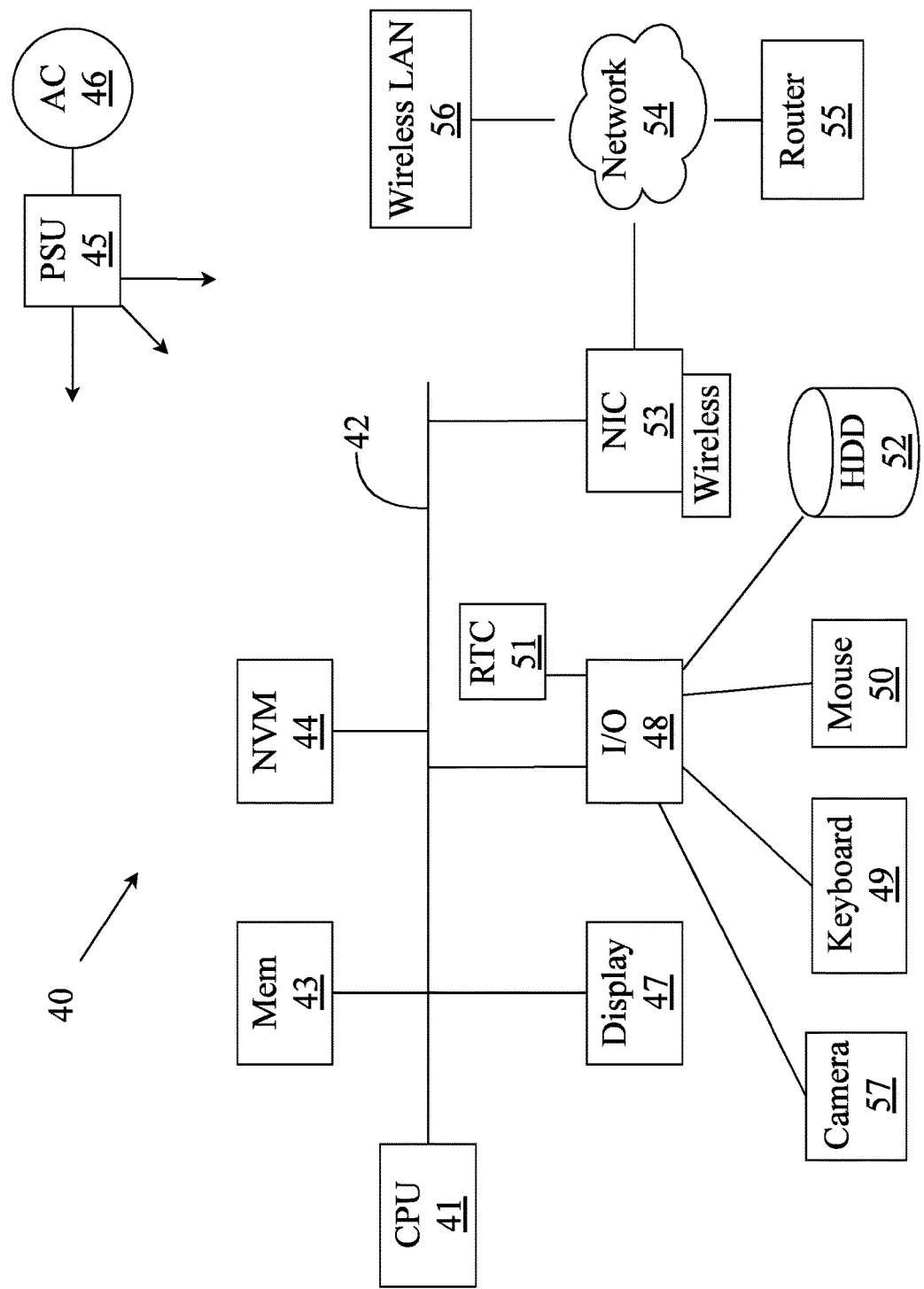
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automating the training of enterprise virtual agents using a range of dynamic or generic data sets, comprising:
    an annotation assistant comprising at least a machine learning model, a first plurality of programming instructions stored in a memory of, and operating on at least one processor of, a computing device, wherein the first plurality of programming instructions, when operating on the at least one processor, cause the computing device to:
        receive data from a plurality of verbal utterance datasets, wherein the data comprises a plurality of verbal utterances;
        embed a plurality of user intention vectors in the received data to produce an utterance model, wherein each of the plurality of embedded user intention vectors is associated with a verbal utterance and is produced using previously-stored association data between an utterance and an intention;
        receive annotated new verbal utterance data from an uncertainty classifier;
        calculate a confidence index for the annotated new verbal utterance data, wherein the confidence index indicates a degree of confidence in the annotations in the annotated new verbal utterance data;
        if the confidence index is above a threshold value, incorporate the annotated new verbal utterance data into the utterance model; and
        send the utterance model to an automated virtual agent; and
    an uncertainty classifier comprising at least a second plurality of programming instructions stored in a memory of, and operating on at least one processor of, a computing device, wherein the second plurality of programming instructions, when operating on the at least one processor, cause the computing device to:
        receive new verbal utterance data from an automated virtual agent;
        compare known verbal utterance data and user intention vectors, to new verbal utterance data with unknown or unclassified user intention vectors, the comparison comprising a plurality of semantic comparison operations;
        use a heuristic to derive similarity and uncertainty index values for the unknown or unclassified user intention vectors;
        annotate at least a portion of the new verbal utterance data, to embed a plurality of user intention vectors, wherein for each of the plurality of user intention vectors the similarity index value is greater than the uncertainty index value; and
        send the annotated new verbal utterance data to the annotation assistant.

2. The system of claim 1, wherein a semantic filter operates as part of an annotation assistant, and receives verbal utterance data from an automated virtual agent that failed to be classified with a user intention vector, and assigns a user intention vector to the verbal utterance data based on the semantic similarities to other, properly assigned verbal utterances.

3. The system of claim 1, wherein the annotation assistant trains and creates a new instance of the automated virtual agent after new verbal utterance data is embedded with user intention vectors, thereby training the new instance of the automated virtual agent with the newly embedded data.

4. The system of claim 1, wherein the verbal utterance datasets are generalized and not designed or curated specifically for any automated virtual agent or annotation system.

5. The system of claim 1, wherein the plurality of semantic comparison operations includes the use of information distance modeling to cluster at least a portion of the new verbal utterance data with a plurality of the unknown or unclassified user intention vectors.

6. The system of claim 5, wherein the information distance modeling comprises the use of Euclidian distance.

7. A method for automating the training of enterprise customer response systems using a range of dynamic or generic data sets, comprising the steps of:
    receiving data from a plurality of verbal utterance datasets, using an annotation assistant;
    embedding a plurality of user intention vectors in the received data to produce an utterance model, wherein each of the plurality of embedded user intention vectors is associated with a verbal utterance and is produced using previously-stored association data between an utterance and an intention;
    receiving annotated new verbal utterance data from an uncertainty classifier, using the annotation assistant;
    calculating a confidence index for the annotated new verbal utterance data, wherein the confidence index indicates a degree of confidence in the annotations in the annotated new verbal utterance data, using the annotation assistant;
    if the confidence index is above a threshold value, incorporating the annotated new verbal utterance data into the utterance model, using the annotation assistant;
    sending the utterance model to an automated virtual agent, using the annotation assistant;

receiving new verbal utterance data from an automated virtual agent, using an uncertainty classifier;

comparing known verbal utterance data and user intention vectors, to new verbal utterance data with unknown or unclassified user intention vectors, the comparison comprising a plurality of semantic comparison operations, using an uncertainty classifier;

using a heuristic to derive similarity and uncertainty index values for the unknown or unclassified user intention vectors, using the uncertainty classifier;

annotating at least a portion of the new verbal utterance data, to embed a plurality of user intention vectors, wherein for each of the plurality of user intention vectors the similarity index value is greater than the uncertainty index value;

sending the annotated new verbal utterance data to the annotation assistant.

8. The method of claim 7, wherein a semantic filter operates as part of an annotation assistant, and receives verbal utterance data from an automated virtual agent that failed to be classified with a user intention vector, and assigns a user intention vector to the verbal utterance data based on the semantic similarities to other, properly assigned verbal utterances.

9. The method of claim 7, wherein the annotation assistant trains and creates a new instance of the automated virtual agent after new verbal utterance data is embedded with user intention vectors, thereby training the new instance of the automated virtual agent with the newly embedded data.

10. The method of claim 7, wherein the verbal utterance datasets are generalized and not designed or curated specifically for any automated virtual agent or annotation system.

11. The method of claim 7, wherein the plurality of semantic comparison operations includes the use of information distance modeling to cluster at least a portion of the new verbal utterance data with a plurality of the unknown or unclassified user intention vectors.

12. The method of claim 11, wherein the information distance modeling comprises the use of Euclidian distance.

* * * * *